United States Patent [19]
Miekka et al.

[11] Patent Number: 6,045,942
[45] Date of Patent: Apr. 4, 2000

[54] LOW PROFILE BATTERY AND METHOD OF MAKING SAME

[75] Inventors: Frederick Noah Miekka, Sierra Madre, Calif.; Stephen E. M. Billester, Bothell, Wash.

[73] Assignee: Avery Dennison Corporation, Pasadena, Calif.

[21] Appl. No.: 08/990,898

[22] Filed: Dec. 15, 1997

[51] Int. Cl.[7] .................................................. H01M 6/40
[52] U.S. Cl. .......................... 429/124; 429/127; 429/162
[58] Field of Search ..................... 429/124, 127, 429/162, 219, 220, 224, 229, 231.6; 29/623.1, 623.3, 623.5

[56] References Cited

U.S. PATENT DOCUMENTS

| | | | |
|---|---|---|---|
| 629,325 | 7/1899 | Ashley . | |
| 629,372 | 7/1899 | Kennedy . | |
| 2,480,531 | 8/1949 | Wilke | 136/111 |
| 3,928,077 | 12/1975 | Sperandio et al. | 136/111 |
| 4,125,685 | 11/1978 | Bloom et al. | 429/122 |
| 4,150,200 | 4/1979 | Sullivan | 429/152 |
| 4,195,121 | 3/1980 | Peterson | 429/127 |
| 4,604,334 | 8/1986 | Tarascon | 429/194 |
| 4,889,777 | 12/1989 | Akuto | 429/162 |
| 5,110,696 | 5/1992 | Shokoohi et al. | 429/218 |
| 5,326,652 | 7/1994 | Lake | 429/127 |
| 5,470,357 | 11/1995 | Schmutz et al. | 29/623.5 |
| 5,536,596 | 7/1996 | Lake | 429/162 |
| 5,624,468 | 4/1997 | Lake | 29/623.5 |
| 5,728,181 | 3/1998 | Jung et al. | 29/623.5 |
| 5,747,191 | 5/1998 | Lake | 429/124 |

*Primary Examiner*—Maria Nuzzolillo
*Assistant Examiner*—J. O'Malley
*Attorney, Agent, or Firm*—Renner, Otto, Boisselle & Sklar, P.L.L.

[57] ABSTRACT

An ultra thin primary battery construction is disclosed along with a method for making same. The battery itself is a laminate construction consisting of a polymer film casing, printed thin film electrodes, and an aqueous electrolyte which is in intimate contact with the active surfaces of both electrodes. In this system, the electrodes themselves consist of a non-reactive conductive ink base having active electrode materials embedded into its surface. The anode to cathode electrode geometry may take one of many forms, however for ease of manufacturing, the anode and cathode electrodes face each other in an offset configuration that eliminates the need for a porous separator. The method of manufacture involves first forming the electrodes onto a polymer film followed by adding the appropriate aqueous electrolyte, and finally sealing the battery. The process for forming the electrodes themselves involves printing a polymer film with a layer of conductive ink, sprinkling an excess of active electrode material in powder form onto the wet surface of the freshly printed ink, drying or curing the ink, and finally removing any loose particles from the surface.

19 Claims, 6 Drawing Sheets

LOW PROFILE BATTERY AND METHOD OF MAKING SAME

FIELD OF THE INVENTION

The invention relates generally to battery technology and more particularly to low profile and ultra thin low-cost primary batteries and methods for making such batteries.

BACKGROUND OF THE INVENTION

In recent years with the advancement in miniaturizing electronic circuits for a variety of applications there has also come a need to miniature the batteries or power sources necessary to power the electronic circuits. Such batteries may typically include a thin, planar anode and cathode separated by a porous separator impregnated with an electrolyte to achieve a low profile or thin power source.

There have been many efforts at achieving a low cost, low profile battery. Unfortunately many of these batteries are expensive and many have involved the use of hazardous materials in order to provide a high power to weight ratio for the battery. Further many of the batteries involve complex manufacturing processes to form the reactive electrodes, often including expensive vacuum metalization or gas stream metal deposition processes, or processes which result in electrodes where the active materials are not in efficient electrical contact with the leads of the battery or which during discharge disrupt the electrical contact making some of the active material unavailable for reaction.

It would be desirable to have a battery that can be manufactured reliably and inexpensively and which provided efficient operation.

SUMMARY OF THE INVENTION

The present invention provides a low profile battery which is easily and inexpensively manufactured yet makes the substantial majority of the active electrode materials available for use in the electrochemical battery reaction.

This invention therefore proposes manufacturing both the anode and cathode electrodes of a thin film primary battery by printing a layer of an electrically conductive ink onto the surface of a non conductive polymer film, sprinkling onto this freshly coated wet surface an active electrode material, curing or drying the conductive ink thus firmly holding the active electrode material at the surface, and finally removing the excess active electrode material that did not adhere to the ink. This process results in thin film electrodes adhered to the surface of a thin film polymer substrate which can then be used to assemble the final battery. The final assembly operation then depends on the geometry and pattern printed. For maximum current density, the electrodes may be placed facing each other with a porous separator and aqueous electrolyte in between. For lower current densities, the battery may be constructed with the electrodes offset, and the electrolyte between without the need of a porous separator. In such an instance the electrodes may be formed adjacent one another on the same non conductive polymer film or may be formed on separate non conductive polymer film which are assembled to confront one another with the electrode materials offset. In each case, an ultra thin battery results which can be manufactured with simple equipment and at minimal cost.

In accordance with one embodiment of the invention, a thin film primary battery includes a non-conductive film substrate, thin film electrodes printed upon the substrate, aqueous electrolyte, and a sealing thin film layer sealing the battery, wherein the thin film electrodes are prepared comprising the steps of printing electrically conductive ink onto said substrate, embedding active electrode material into the wet surface of the printed conductive ink and drying the conductive ink.

In accordance with another embodiment of the invention, a method of making an electrode for a thin film battery includes the steps of printing wet electrically conductive ink onto an electrically non-conductive substrate, embedding active electrode material into the wet surface of the printed conductive ink and drying the conductive ink.

In accordance with another embodiment of the invention, a label includes a thin film primary battery comprising a non-conductive film substrate, thin film electrodes printed upon the substrate, aqueous electrolyte, and a sealing thin film layer sealing the battery, wherein the thin film electrodes are prepared comprising the steps of printing wet electrically conductive ink onto said substrate, embedding active electrode material into the wet surface of the printed conductive ink and drying the conductive ink; and a pressure sensitive adhesive disposed on at least a portion of the substrate.

In accordance with still another embodiment of the invention, a thin film primary battery includes a pair of confronting non-conductive film substrates, a cathodic thin film electrode printed upon one of the substrates and an anodic thin film electrode printed on the other substrate, the orientation of the anodic and cathodic electrodes on the respective substrates being staggered so that they lie substantially in the same plane and are separated by a gap substantially filled with an aqueous electrolyte disposed between the substrates.

In accordance with a further embodiment of the invention, a method of making a thin film battery includes the steps of printing a pattern of wet electrically conductive ink onto an electrically non-conductive substrate, embedding a first active electrode material into the wet surface of a first portion of the conductive ink to form an anodic electrode, embedding a second active electrode material into the wet surface of a second portion of the conductive ink to form a cathodic electrode, drying the conductive ink, and sealing an aqueous electrolyte in contact with the electrodes.

In accordance with a still further embodiment of the invention, a method of making a thin film battery includes the steps of printing wet electrically conductive ink onto a first electrically non-conductive substrate and embedding a first active electrode material into the wet surface of the conductive ink to form an anodic electrode, printing wet electrically conductive ink onto a second electrically non-conductive substrate and embedding a second active electrode material into the wet surface of the conductive ink to form a cathodic electrode, drying the conductive ink, assembling the substrates with the electrode sides confronting and sealing an aqueous electrolyte in contact with the electrodes.

In accordance with an even further embodiment of the invention, a thin film battery includes a pair of non-conductive film substrates, a cathodic thin film electrode printed upon one of the substrates and an anodic thin film electrode printed on the other substrate, a porous separator separating the anodic and cathodic electrodes; and a reservoir of aqueous electrolyte for isolating the electrolyte from the electrodes prior to use of the battery and for providing aqueous electrolyte to the electrodes through the porous separator when it is desired to place the battery in use.

In general, the invention comprises the foregoing and other features hereinafter fully described and particularly pointed in the claims, the following description and the annexed drawings setting forth in detail a certain illustrated embodiment of the invention, this being indicative, however, of but one of the various ways in which the principles of the invention may be employed.

DETAILED DESCRIPTION OF THE INVENTION

Figure 1:
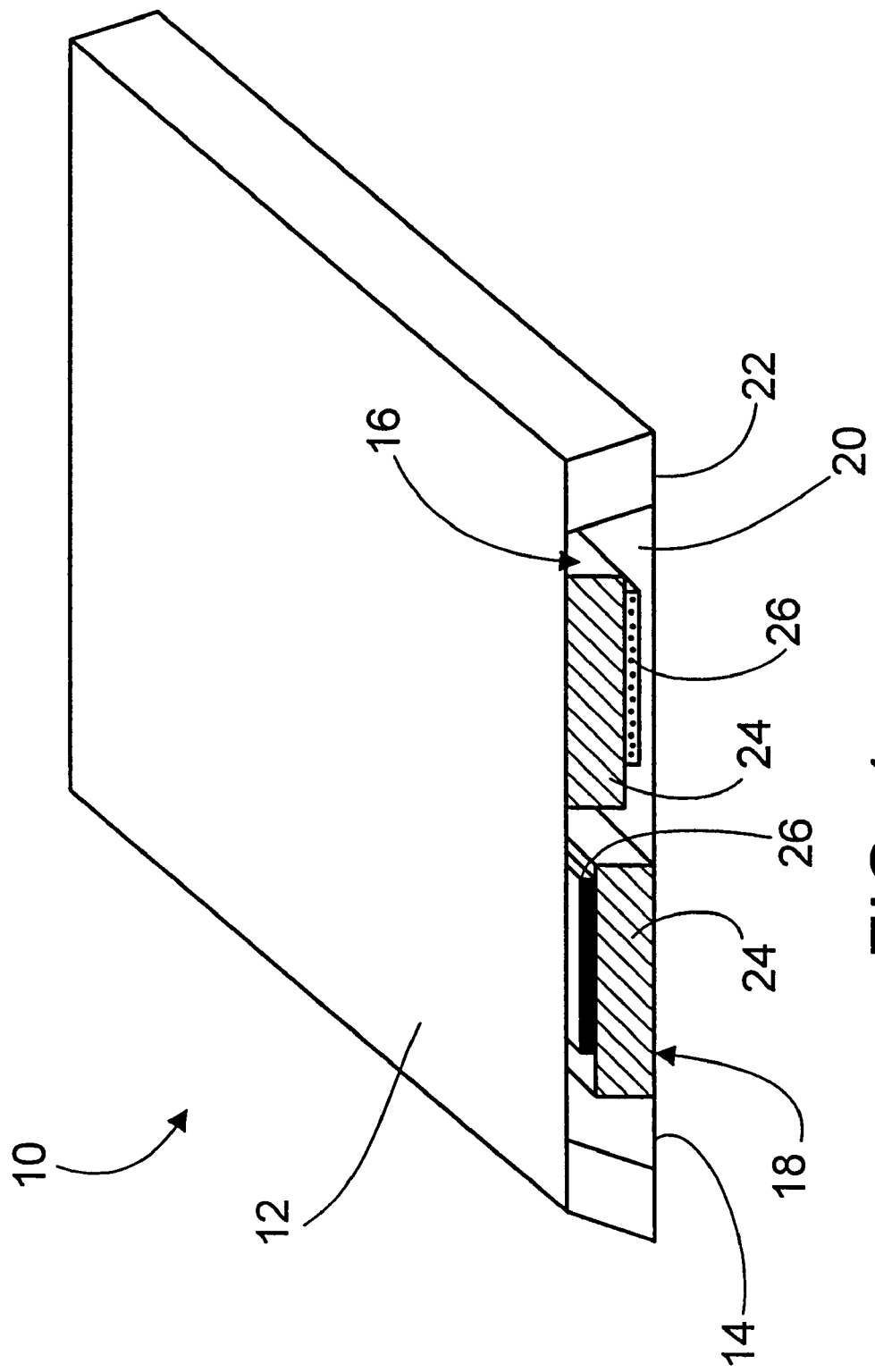
FIG. 1 is a diagram in partial cross section showing the planar, offset electrode construction of a single cell battery in accordance with the teachings of this invention.

With reference to the figures in general and initially to FIG. 1 in specific there is shown a cross section of a thin film, single cell battery 10 according to an embodiment of the present invention. The thin film battery includes top electrically non conductive substrate 12 and bottom electrically non-conductive substrate 14 each having a thin film electrode 16, 18, respectively, printed thereon. An aqueous electrolyte 20 is sealed by a flexible sealant 22 between the substrates 12 and 14 in contact with the battery electrodes 16 and 18. Through a process to be described in more depth below, the electrodes 16 and 18 are formed on the respective substrates 12 and 14 by printing a wet electrically conductive ink 24 which is preferably non-reactive upon the substrates, embedding an active electrode material 26 in the surface of the conductive ink, such as by sprinkling the active electrode material on the freshly printed wet conductive ink, and then drying the ink.

The electrically conductive ink 24 is preferably made of a material that has good electrical conductivity and does not participate in the battery reaction, such as a silver metal or nickel metal based polymer inks. The electrodes 16, 18 are made to behave as an anode or cathode in the battery by the proper choice of the active electrode material 26 embedded in the surface of the conductive ink 24. For example, consider the electrode 16 to be the anode of the battery 10 and the electrode 18 to be the cathode. A suitable active electrode material 26 to embed in the surface of the conductive ink 24 to form the anode 16 would be zinc and a suitable active electrode material to form the cathode 18 would be a metal oxide such as copper oxide or silver oxide. In such a case a suitable aqueous electrolyte 20 would be potassium hydroxide.

However, it would be readily appreciated that the conductive ink 24, active electrode materials 26 and aqueous electrolyte 20 may be other materials or combinations of materials which cooperatively participate to produce the desired electrochemical reaction. Generally, the cathode electrode includes a material which acts in the overall system as an oxidizing agent. This includes but is not limited to groups of materials classed as metallic oxides and hydroxides such as cupric oxide, silver oxide, manganese dioxide, vanadium pentoxide, nickel hydroxide and others. The anode electrode includes an active material that is easily oxidized and thus functions as an available source of electrons. Materials that exhibit this property include but are not limited to easily oxidizable metals such as aluminum, zinc, magnesium, iron, and titanium. The electrolyte is chosen based on the overall chemistry required by the battery and may include an aqueous solution of an acid, a base, or a salt.

Preferably the electrodes 16, 18 of the thin film battery 10 are disposed on the respective substrates offset with respect to one another so that the electrodes lie substantially in a planar, spaced relationship. In this relationship since the electrodes 16, 18 are spaced from one another by virtue of their positioning on the substrates, there is no need for a conventional porous separator, thereby reducing the thickness of the battery. Moreover, the spacing of the electrodes 16 and 18 functionally acts essentially as a current limiting resistor and defines the current delivering capacity of the battery 10. Accordingly, the current deliverable by the battery 10 can be controlled to safe levels for a desired application by selecting the appropriate spacing between the electrodes 16, 18 without the cost or space requirements for an additional current limiting resistor.

Figure 2:
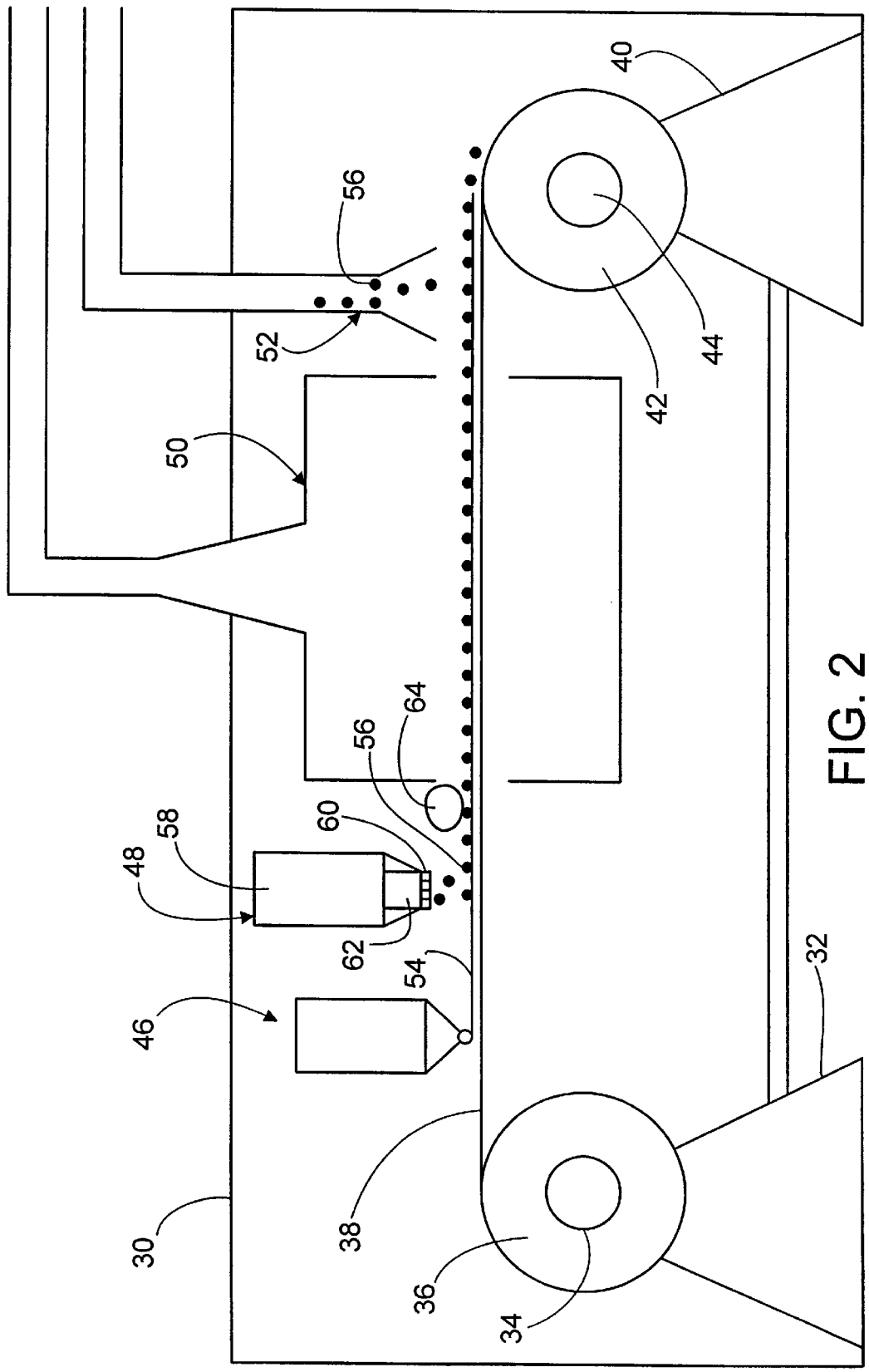
FIG. 2 is a schematic diagram of a production line for the manufacture of a thin film battery electrode.

Referring to FIG. 2 there is shown schematically a production line 30 for forming an electrode, such as one of the electrodes 16, 18 described above, on a non-conductive substrate. Starting at the left end in the figure, the production line 30 includes an unwind stand 32 having mounted onto its chuck 34, a roll 36 of thin polymer film 38 extending to a rewind stand 40 having a roll 42 mounted on a chuck 44 for holding the formed substrate and electrode material. The thin polymer film 38 alone or in part forms the non-conductive substrate and may be a material such as mylar, polyethylene, polyamide or any other non conductive film substrate upon which a suitable electrically conductive ink could be printed.

At intermediate positions between the unwind stand 32 and rewind stand 40 are located a printing station 46, a powder coating station 48, a drying station 50 and a powder removal station 52. During operation, as polymer film 38 is unrolled from the unwind station 32 it passes underneath the printing station 46 which prints the electrically conductive polymer ink 54 in a wet or uncured form upon the top surface of the polymer film 38 in the desired areas. (As used herein the term "wet" is used to include both materials that include a solvent and are solidified by drying and materials that are in an uncured state but can be cured through a method other than drying such as through the application of ultraviolet light or combinations thereof.) The areas where the conductive ink is to be printed corresponds to areas on the substrate that are to have electrodes formed thereon and/or areas that act as conductive paths interconnecting the electrodes to the battery terminals. Preferably, the electrodes are formed separately from areas of conductive ink in which no active electrode materials are to be embedded to prevent the possibility of active material overflowing to the area desired to be non-reactive.

As the wet conductive ink 54 passes beneath the powder coating station 48 one of the active electrode materials 56, such as the zinc or metal oxides mentioned above, is applied to the desired areas of the exposed wet conductive ink 54. The powder coating station 48 can be any of several different configurations capable of depositing the active material powder 56 on the wet conductive ink surface 54. For example, powder coating station 48 may include a hopper portion 58 having a screen 60 located near the bottom. To activate the flow of powdered active electrode material 56 from powder coating station 48, a small vibrating or oscillating device 62 may be employed to shake the screen 60. This shaking action disturbs the active material powder 56 causing it to fall by way of gravity and become embedded into the wet surface of the freshly coated conductive ink 54.

Other methods of embedding the active electrode material 56 into the conductive ink can also be employed as would be appreciated by one skilled in the art. For example, the polymer film 38 having the wet conductive ink applied thereto such as by the printing method described above could be passed through a fluidized bed or other source of excess active material 56. Moreover, the active electrode material 56 may be in a form other than a powder such as fine particularates. Once active electrode material 56 has been applied to wet conductive ink surface 54, the active material may be pressed into the wet conductive ink such as by way of a small roller 64.

After the active electrode material 56 has been suitably embedded in the wet conductive ink surface 54, the conductive ink layer is dried or cured as it is conveyed past the curing/drying station 50 to anchor the active electrode material firmly in place. In the case of a solvent based conductive ink 54, the ink may be dried by applying hot air. In the case of an ultraviolet curable conductive ink, ultraviolet light of a suitable wavelength, intensity and duration may be employed in the drying station 50. (As used herein the term "drying" and its variations are used to include the removal of a solvent from a wet ink as well as the curing of a "wet" curable ink.)

As there may be some loose active electrode material 56 on the surface of the conductive ink 56 that is not solidly anchored to the surface of the cured conductive ink, the substrate preferably passes through the powder removal station 52 to remove the excess active material and thus to prevent possible short circuits and/or other damage to the constructed battery 10. The finished substrate and electrode material is then wound up by rewind station 40 for later use in assembling the battery.

When it is necessary to form non-reactive areas of conductive ink not having active material embedded therein, such as to form electrical interconnections and electrical conductive paths, a multi-step printing process may be employed. In the multi-step process, a first layer of electrically conductive ink covering the entire area of electrodes and non-reactive conductive paths is preferably printed in the desired pattern and the ink is dried or cured. A second layer of conductive ink is then printed only over the areas of the first layer where there are to be electrodes. The active electrode material is then applied to the still wet areas of conductive ink, the ink is dried and the excess active material is removed as described above.

When both the anodic and cathodic electrodes are to be printed on the same substrate, an additional printing step may be used in which the anodic electrodes are printed made first by printing conductive ink in the areas of the anodic electrodes and then embedding the appropriate active material, such as zinc, in the wet conductive ink, drying the ink and then removing excess ink. The cathodic electrode is then formed in the same manner but with a different active material, such as silver oxide, at different areas on the substrate. Preferably, however, the anodic and cathodic electrodes are formed on different substrates to reduce the risk on cross mixing of the active materials, and the battery is assembled with one of the substrates inverted so that the anodic and cathodic electrodes are confronting or coplanar.

To complete the assembly of the battery 10 as shown in FIG. 1, the anode electrode 16 is formed on the substrate 12 with an appropriate non-reactive conductive path to a corresponding battery terminal and the cathode electrode 18 is formed on the substrate 14 with the appropriate conductive path to the cathode battery terminal. The substrates 12 and 14 are then assembled with one substrate inverted and the electrodes offset to come to lie in a coplanar relationship. The substrates 12 and 14 are then sealed such as through a heat seal or pressure sensitive adhesive seal with the aqueous electrode material therebetween.

Figure 3:
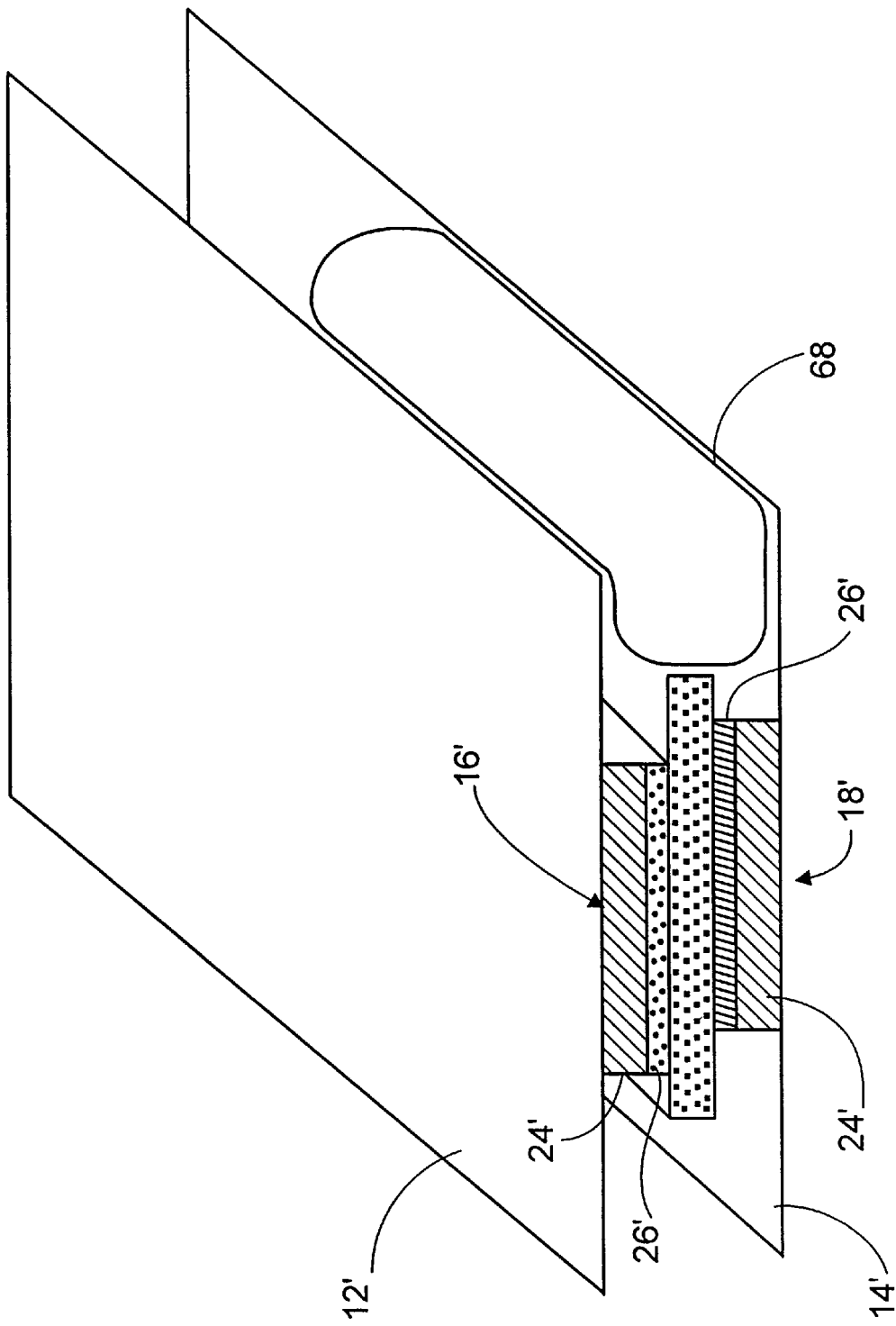
FIG. 3 is a diagram in partial cross section showing the stacked electrode configuration of a single cell battery in accordance with the teachings of this invention.

A battery 10' including a single anode electrode 16' and single cathode electrode 18' in a stacked arrangement with a porous separator 66 disposed therebetween is illustrated in FIG. 3. The electrodes 16' and 18' of the battery 10' are manufactured as described above but are not offset. The porous separator 66 is saturated with the electrolyte solution to maintain the electrochemical reaction between the anode and cathode. In some situations, the electrolyte solution may be maintained in a sealed container such as a plastic bag or enclosure 68 before the battery need be made operational. When it is desired to make the battery operational, the enclosure 68 is ruptured, such as by squeezing the battery, causing the electrolyte solution to migrate through the porous separator by wicking action. The electrolyte enclosure 68 may be employed with other battery embodiments as will be appreciated by those of skill in the art, including many of the battery embodiments disclosed herein.

Figure 4:
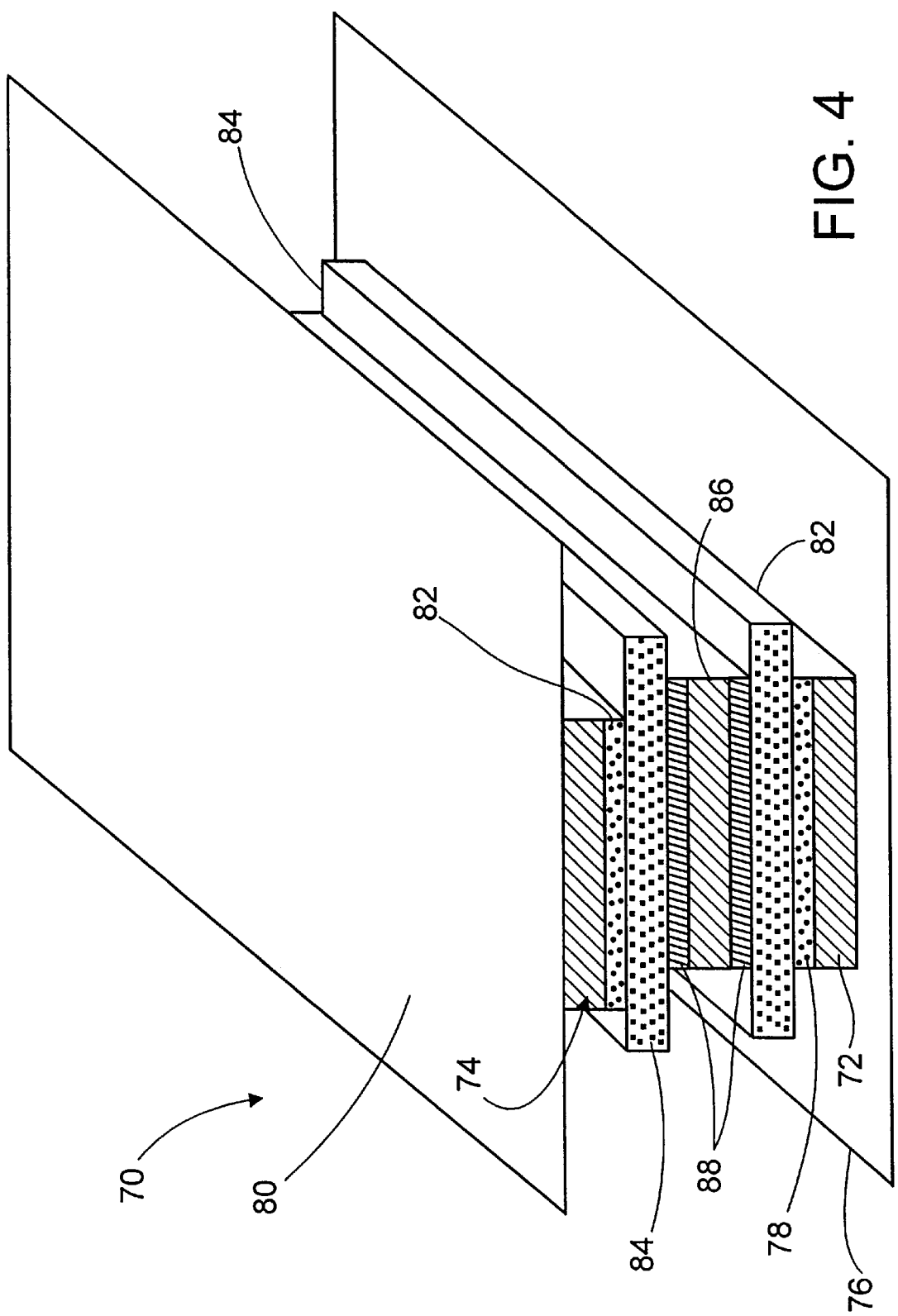
FIG. 4 is a diagram in partial cross section showing a single cell battery having two different voltage taps in the stacked cell configuration.

Referring now to FIG. 4 there is shown a single cell battery 70 employing two anodes 72, 74, each of which has a different half cell potential resulting in a single cell battery providing dual voltages. The lower anode 72 is printed on the lower substrate 76 and embedded with an active electrode material 78 as described above. The active electrode material 78 is selected to have a half cell potential with respect to the battery chemistry and the cathode to give a specific voltage. The upper anode 74 is printed on the upper substrate 80 and embedded with an active electrode material 82 different from the active electrode material 78 in the same manner. Sandwiched between the anodes 72 and 74 and separated from the anodes by porous separators 84 is a cathode 86. The cathode 86 is embedded with an active electrode material 88 on both sides, such as a metal oxide or hydroxide. As a result of the different active electrode material embedded in the lower and upper anodes 72, 74, each electrode will produce a different voltage with respect to the cathode 86.

For example, a single cell battery 70 can be prepared according to the following chemical composition: the active anode material 78 is zinc powder; the active anode material 82 is magnesium powder; the active cathode electrode material 88 is manganese dioxide; and aqueous electrolyte solution is a strong solution of ammonium chloride.

Figure 5:
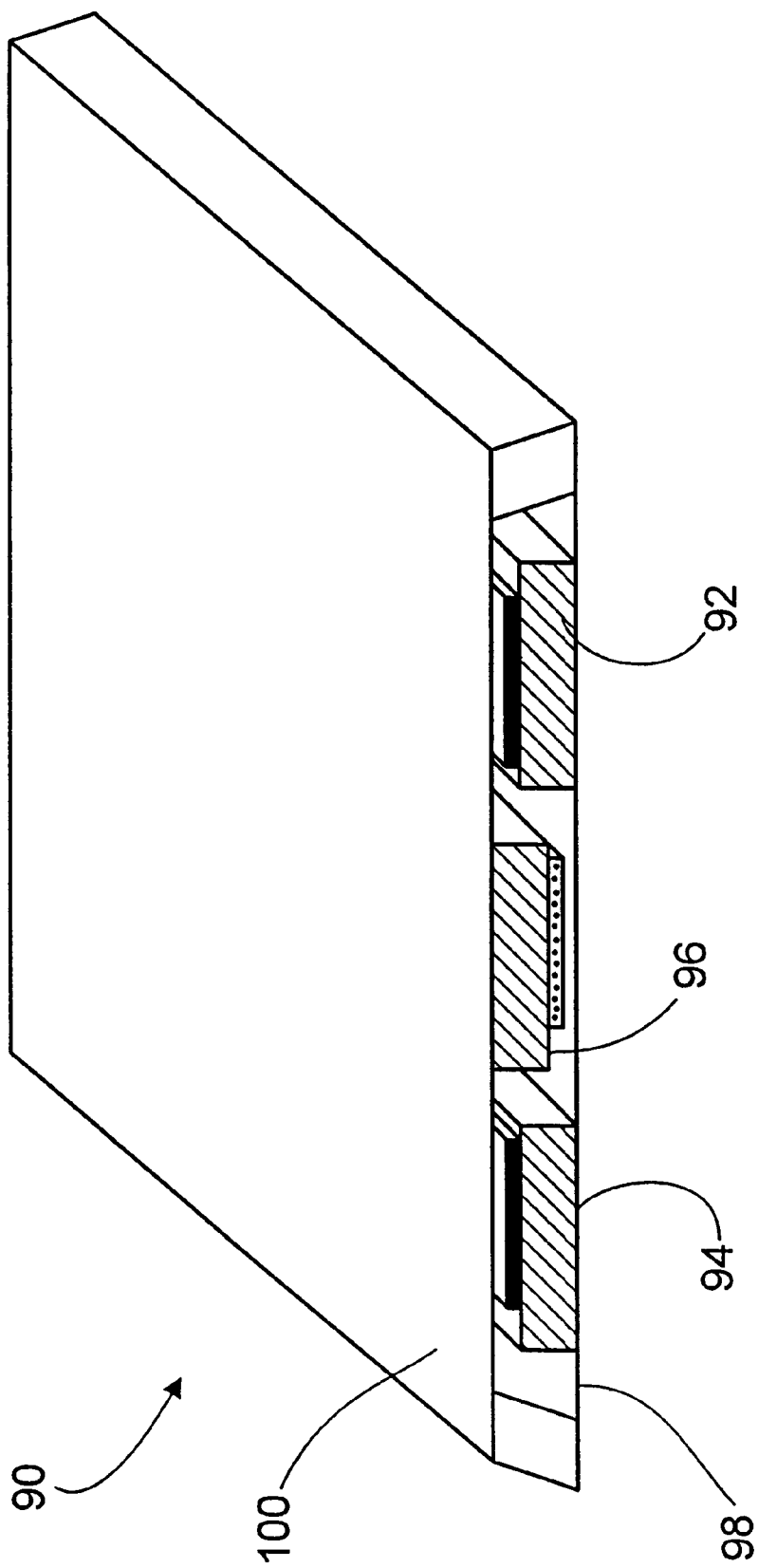
FIG. 5 is a diagram in partial cross section showing a single cell battery having two different voltage taps in the offset, coplanar cell configuration; and, FIG. 6 is a diagram of a finished and functional single cell battery in accordance with the teachings of this invention.

FIG. 5 is a cross sectional view of a dual voltage, single cell battery 90 having the electrodes in the offset, coplanar geometry. In this case there are two different cathodes 92, 94 and a common anode electrode 96. The lower non-conductive substrate 98 is printed with the two cathodes 92, 94 as described above, with the upper non-conductive substrate 100 having the anode 96 printed thereon.

Figure 6:
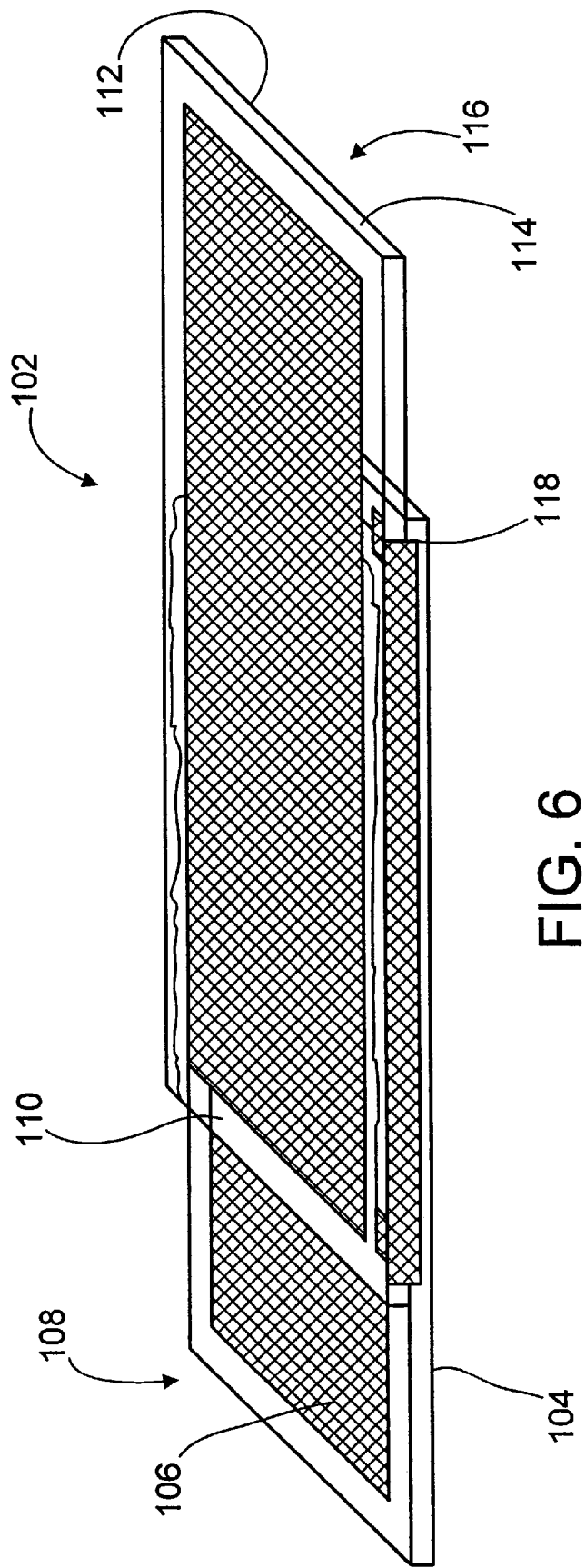

A completed thin film battery 102 in accordance with the invention is shown in FIG. 6. The lower non-conductive film layer 104 supports conductive ink cathode base layer 106 which is exposed at the end 108 for the purposes of making electrical contact as a battery terminal. A porous separator 110 holds aqueous electrolyte as well as physically separating the cathode layer 106 from the anode layer 112. The anode layer 112 is printed on the upper non-conductive film layer 114. A suitable area of anode electrode layer 112 protrudes past the electrochemical portion of the cell at end 116 for the purposes of electrical contact as a battery terminal. The seal 118 traps electrolyte in the cell between lower non-conductive film layer 104 and the upper non-conductive 114. The active electrode materials of course are present but are not shown. One of the non conductive film layers 104 or 114 may be coated with an adhesive (not shown) so that the battery 102 may be applied to another product or surface as a label. Furthermore, an electrical circuit to be powered by the battery 102 may be printed or applied directly or indirectly to one of the non-conductive substrates 104 or 114 to form an integral battery and circuit package or label.

What is claimed is:

1. A thin film primary battery comprising a non-conductive film substrate, thin film electrodes printed upon the substrate, aqueous electrolyte, and a sealing thin film layer sealing the battery, wherein the thin film electrodes are prepared comprising the steps of printing electrically conductive ink onto said substrate, embedding active electrode material into the wet surface of the printed conductive ink and drying the conductive ink, wherein a common cathodic electrode is employed with two or more chemically different anodic electrodes to allow for multiple voltage outputs from the same battery.

2. The battery of claim 1, wherein the cathodic electrodes and anodic electrodes are printed on separate substrates.

3. The battery of claim 2, wherein the separate substrates are assembled with the electrode sides confronting each other and the electrodes being offset.

4. The battery of claim 1, wherein the cathodic and anodic electrodes are physically spaced by their respective locations on a substrate without a porous separator.

5. The battery of claim 1 wherein the electrodes are stacked atop one another with a porous separator disposed therebetween.

6. The battery of claim 1 wherein the active electrode material for the common cathodic electrode is silver oxide, the active electrode material for one anodic electrode is magnesium, the active electrode material for the other anodic electrode is zinc, and the electrolyte is aqueous potassium hydroxide.

7. The battery of claim 1 wherein said electrically conductive ink is electrically conductive silver based metallic ink.

8. The battery of claim 1 wherein the step of drying the conductive ink includes curing.

9. The battery of claim 1 wherein the step of embedding includes sprinkling active electrode material on the wet electrically conductive ink.

10. The battery of claim 1 wherein the active electrode material is in the form of a powder.

11. The battery of claim 1 wherein the substrate is provided with a pressure sensitive adhesive on the side opposite the electrode.

12. A thin film primary battery comprising a non-conductive film substrate, thin film electrodes printed upon the substrate, aqueous electrolyte, and a sealing thin film layer sealing the battery, wherein the thin film electrodes are prepared comprising the steps of printing electrically conductive ink onto said substrate, embedding active electrode material into the wet surface of the printed conductive ink and drying the conductive ink, wherein a common anodic electrode is employed with two or more chemically different cathodic electrodes to allow for multiple voltage outputs from the same battery.

13. The battery of claim 12 wherein the active electrode material for the common anodic electrode is zinc, the active electrode material for one cathodic electrode is silver oxide, the active electrode material for the other cathodic electrode is copper oxide, and the electrolyte is potassium hydroxide.

14. A thin film battery comprising a pair of confronting non-conductive film substrates, a cathodic thin film electrode printed upon one of the substrates and an anodic thin film electrode printed on the other substrate, the orientation of the anodic and cathodic electrodes on the respective substrates being staggered so that they lie substantially in the same plane and are separated by a gap substantially filled with an aqueous electrolyte disposed between the substrates, wherein a common cathodic electrode is employed with two or more chemically different anodic electrodes to allow for multiple voltage outputs from the same battery.

15. The battery of claim 14, wherein the gap is sized to provide a battery having a specific current limit.

16. The battery of claim 14, wherein the electrodes include an electrically conductive layer of a chemically inactive electrode material having an active metal material embedded therein.

17. A thin film battery comprising a pair of confronting non-conductive film substrates, a cathodic thin film electrode printed upon one of the substrates and an anodic thin film electrode printed on the other substrate, the orientation of the anodic and cathodic electrodes on the respective substrates being staggered so that they lie substantially in the same plane and are separated by a gap substantially filled with an aqueous electrolyte disposed between the substrates, wherein a common anodic electrode is employed with two or more chemically different cathodic electrodes to allow for multiple voltage outputs from the same battery.

18. The battery of claim 17, wherein the gap is sized to provide a battery having a specific current limit.

19. The battery of claim 17, wherein the electrodes include an electrically conductive layer of a chemically inactive electrode material having an active metal material embedded therein.

* * * * *